US011378683B2

(12) United States Patent
Alexanian et al.

(10) Patent No.: US 11,378,683 B2
(45) Date of Patent: Jul. 5, 2022

(54) VEHICLE RADAR SENSOR ASSEMBLIES

(71) Applicant: VEONEER US, INC., Southfield, MI (US)

(72) Inventors: Angelos Alexanian, Lexington, MA (US); Scott B. Doyle, Sudbury, MA (US); Konstantinos Konstantinidis, Wurzburg (DE); Arnold Mobius, North Chelmsford, MA (US)

(73) Assignee: Veoneer US, Inc., Southfield, MI (US)

( * ) Notice: Subject to any disclaimer, the term of this patent is extended or adjusted under 35 U.S.C. 154(b) by 184 days.

(21) Appl. No.: 16/789,373

(22) Filed: Feb. 12, 2020

(65) Prior Publication Data

US 2021/0247512 A1    Aug. 12, 2021

(51) Int. Cl.
*G01S 13/931*    (2020.01)
*H01Q 21/00*    (2006.01)
(Continued)

(52) U.S. Cl.
CPC .............. *G01S 13/931* (2013.01); *H01Q 1/32* (2013.01); *H01Q 21/005* (2013.01); *G01S 7/4026* (2013.01)

(58) Field of Classification Search
CPC ........ G01S 13/931; H01Q 1/32; H01Q 13/10; H01Q 21/0043; H01Q 21/005
See application file for complete search history.

(56) References Cited

U.S. PATENT DOCUMENTS 5,638,079 A * 6/1997 Kastner ................. H01Q 13/22
343/768
6,483,481 B1 * 11/2002 Sievenpiper ......... H01Q 15/008
343/700 MS
(Continued)

FOREIGN PATENT DOCUMENTS

CN         102931492         2/2015
CN         106207357         12/2016
(Continued)

OTHER PUBLICATIONS

CN102931492, Feb. 11, 2015, Beijing Institute of Telemetry Technology, Machine Translation (9 pages).
(Continued)

*Primary Examiner* — Peter M Bythrow
(74) *Attorney, Agent, or Firm* — Matthew D. Thayne; Thayne and Davis LLC

(57) ABSTRACT

RADAR sensor assemblies/modules, particularly those for vehicles. In some embodiments, the assembly may comprise a plurality of waveguides, each waveguide of the plurality of waveguides being defined by a waveguide groove. A slot may be positioned to extend along an axis of each of the plurality of waveguide grooves. Each of the waveguides may be further defined, at least in part, by a periodic feature that extends back and forth in a periodic manner along at least a portion of its respective waveguide and a plurality of periodic signal confinement structures, a first periodic signal confinement structure of which may extend adjacent to a first side of each of the plurality of waveguides, and a second periodic signal confinement structure which may extend along a second side of each of the plurality of waveguides opposite the first side.

20 Claims, 13 Drawing Sheets

(51) Int. Cl.
*H01Q 1/32* (2006.01)
*G01S 7/40* (2006.01)

(56) References Cited

U.S. PATENT DOCUMENTS

| | | | |
|---|---|---|---|
| 7,132,905 B2 | 11/2006 | Sano | |
| 8,040,286 B2* | 10/2011 | Matsuo | H01P 5/02 343/771 |
| 8,779,995 B2* | 7/2014 | Kirino | H01Q 1/3291 343/713 |
| 8,803,638 B2* | 8/2014 | Kildal | H01P 3/087 333/248 |
| 9,153,851 B2 | 10/2015 | Nakamura | |
| 9,252,475 B2 | 2/2016 | Milyakh et al. | |
| 9,666,931 B2* | 5/2017 | Suzuki | H01P 5/107 |
| 10,164,344 B2* | 12/2018 | Kirino | H01Q 21/0093 |
| 10,186,787 B1* | 1/2019 | Wang | H01Q 21/005 |
| 10,381,741 B2* | 8/2019 | Kirino | H01Q 1/3233 |
| 10,971,806 B2* | 4/2021 | Rogers | H01Q 1/286 |
| 2002/0101385 A1* | 8/2002 | Huor | H01Q 21/005 343/770 |
| 2003/0011517 A1* | 1/2003 | Kolak | H01Q 11/02 343/700 MS |
| 2003/0117245 A1* | 6/2003 | Okajima | H01P 5/10 333/238 |
| 2004/0066346 A1* | 4/2004 | Huor | H01Q 21/064 343/770 |
| 2004/0113840 A1* | 6/2004 | Gottwald | H01Q 9/045 343/700 MS |
| 2005/0128028 A1* | 6/2005 | Sanchez | H01Q 3/04 333/157 |
| 2005/0280592 A1* | 12/2005 | Yegin | H01Q 9/0407 343/725 |
| 2007/0152868 A1 | 7/2007 | Schoebel | |
| 2007/0188258 A1* | 8/2007 | Ohno | H01P 5/107 333/26 |
| 2011/0043423 A1* | 2/2011 | Kirino | H01Q 1/3233 343/776 |
| 2011/0050356 A1 | 3/2011 | Nakamura et al. | |
| 2011/0181373 A1* | 7/2011 | Kildal | H01P 1/2005 333/239 |
| 2011/0187614 A1* | 8/2011 | Kirino | H01Q 3/32 343/713 |
| 2015/0288063 A1* | 10/2015 | Johnson | H01Q 3/26 342/352 |
| 2017/0187121 A1 | 6/2017 | Kirino et al. | |
| 2018/0013208 A1* | 1/2018 | Izadian | H01P 11/002 |
| 2018/0269557 A1* | 9/2018 | Fangfang | H01Q 13/106 |
| 2018/0277962 A1* | 9/2018 | Kamo | H01Q 21/064 |
| 2018/0351261 A1* | 12/2018 | Kamo | H01Q 21/064 |
| 2018/0358709 A1* | 12/2018 | You | H01Q 13/106 |
| 2019/0058260 A1* | 2/2019 | Kirino | H01Q 21/064 |
| 2019/0081395 A1* | 3/2019 | Daniel | H01Q 21/005 |
| 2019/0187247 A1* | 6/2019 | Izadian | G01S 7/41 |
| 2019/0305396 A1* | 10/2019 | Dogiamis | H01P 5/12 |
| 2019/0379132 A1* | 12/2019 | Pelletti | H01Q 21/065 |
| 2019/0379136 A1* | 12/2019 | Kirino | H01Q 13/06 |
| 2020/0112077 A1* | 4/2020 | Kamo | H01P 5/024 |
| 2020/0168974 A1* | 5/2020 | Vosoogh | H01P 1/2005 |
| 2020/0185802 A1* | 6/2020 | Vilenskiy | H01Q 1/241 |
| 2020/0194862 A1* | 6/2020 | Kamo | H01P 5/024 |
| 2020/0203849 A1* | 6/2020 | Lim | H01P 5/12 |
| 2020/0212594 A1* | 7/2020 | Kirino | H01P 3/123 |
| 2020/0227807 A1* | 7/2020 | Kirino | H05B 6/806 |
| 2020/0251831 A1* | 8/2020 | Kirino | H01Q 13/16 |
| 2020/0287291 A1* | 9/2020 | Yang | H01Q 21/0037 |
| 2020/0335873 A1* | 10/2020 | Achour | H01Q 1/3233 |
| 2020/0412012 A1* | 12/2020 | Zhao | H01Q 1/28 |
| 2021/0135373 A1* | 5/2021 | Spielmann | G01S 13/32 |
| 2021/0167518 A1* | 6/2021 | Achour | H01Q 21/005 |
| 2021/0194150 A1* | 6/2021 | Lim | H01Q 3/22 |
| 2021/0305667 A1* | 9/2021 | Bencivenni | H01P 1/207 |

FOREIGN PATENT DOCUMENTS

| | | |
|---|---|---|
| EP | 2267841 | 12/2010 |
| WO | 2019022651 | 1/2019 |

OTHER PUBLICATIONS

CN106207357, Dec. 7, 2016, Chengdu Xanaway Technology Co., Ltd., Machine Translation (58 pages).

Goussetis, G. et al., Tailoring the AMC and EBG characteristics of periodic metallic arrays printed on grounded dielectric substrate, IEE Transactions on Antennas and Propagation, vol. 51, No. 1, Jan. 2006 (8 pages).

Zhang, Y. et al., Planar Artificial Magnetic Conductors and Patch Antennas, IEE Transactions on Antennas and Propagation, vol. 51, No. 10, Oct. 2003 (9 pages).

Mosallaei, H., et al., Antenna Miniaturization and Bandwidth Enhancement Using a Reactive Impedance Substrate, IEE Transactions on Antennas and Propagation, vol. 52, No. 9, Sep. 2004 (12 pages).

PCT/US2021/017727, International Search Report, dated Apr. 23, 2021 (2 pgs).

PCT/US2021/017727, Written Opinion, dated Apr. 23, 2021 (7 pgs).

* cited by examiner

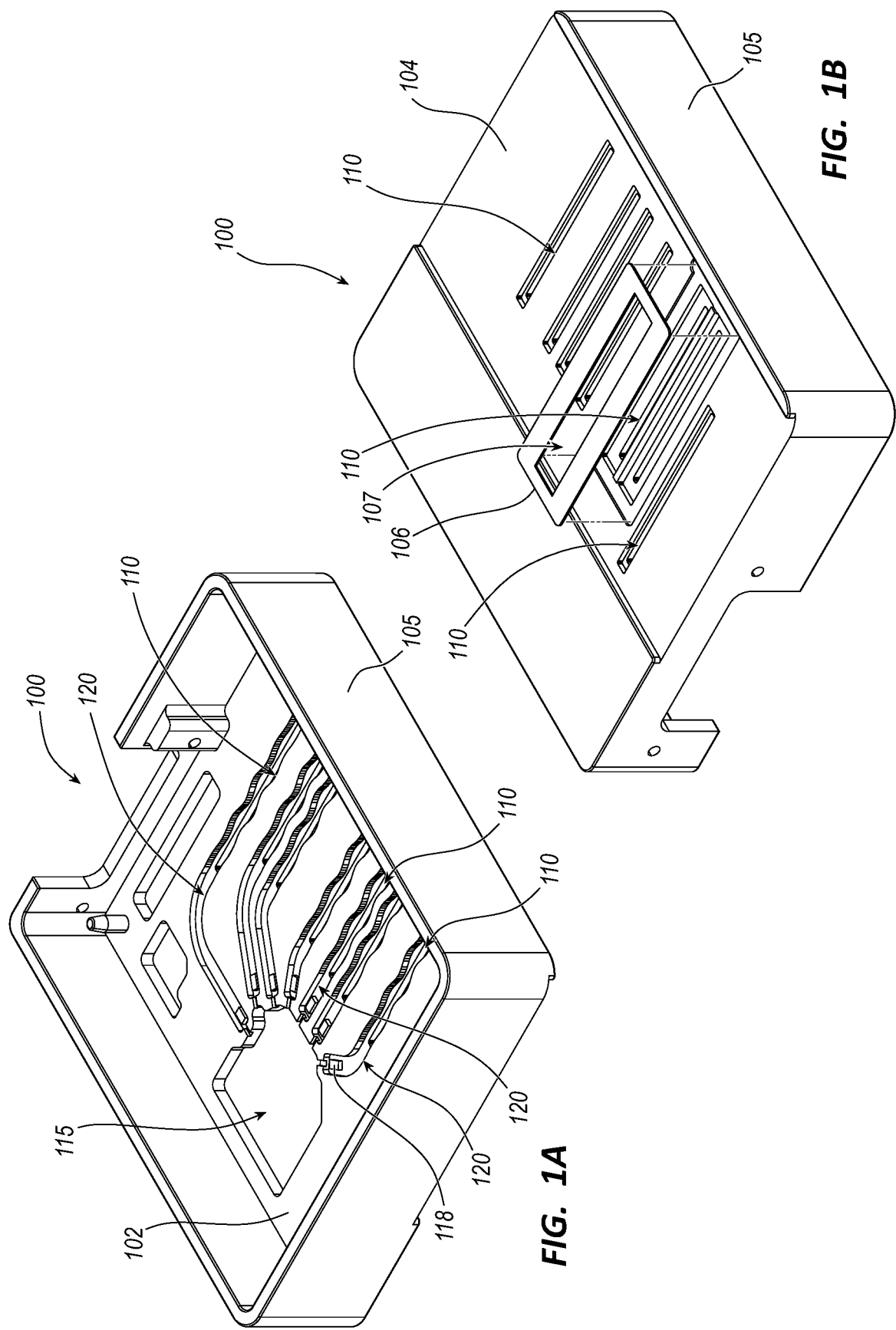

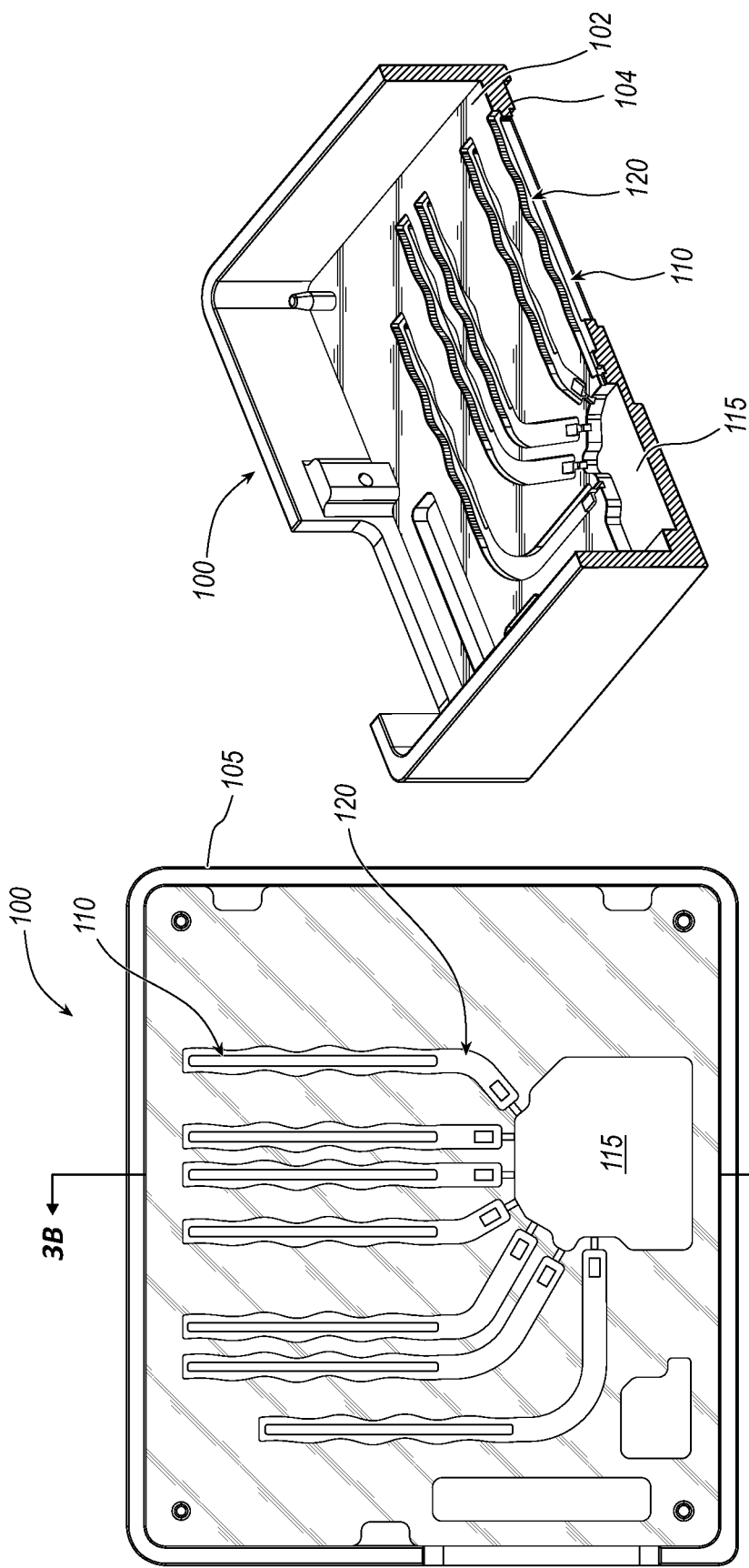

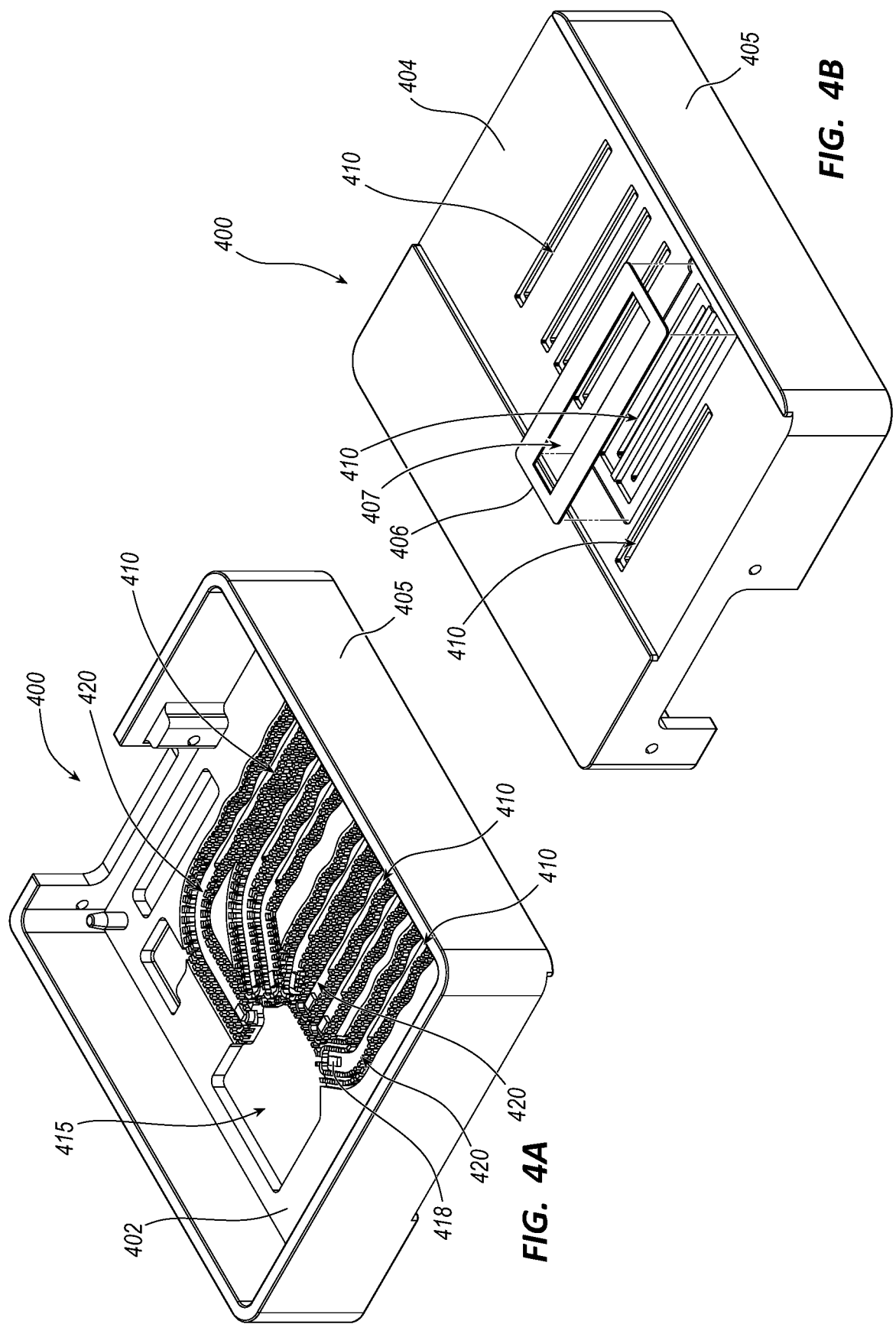

VEHICLE RADAR SENSOR ASSEMBLIES

SUMMARY

Disclosed herein are various embodiments of sensor assemblies, such as RADAR sensor assemblies for vehicles.

In an example of a vehicle sensor assembly according to some embodiments, the assembly may comprise a waveguide block defining a plurality of waveguides, each waveguide being defined, at least in part, by a waveguide groove. One or more of the waveguide grooves may be defined by one or more rows of posts on each side of the groove defining the groove therebetween or by a trench-style waveguide groove having continuous sidewalls. An antenna structure may be operably coupled with plurality of waveguides and may comprise an array of one or more slots extending along an axis of each waveguide groove of the plurality of waveguides. Each of the one or more slots may be configured to deliver electromagnetic radiation from at least one of the plurality of waveguides therethrough. One or both of the plurality of waveguide grooves and the one or more slots may extend along the axis of its respective waveguide, in some embodiments at least partially in a periodic, quasi-periodic, and/or meandering manner along at least a portion of the axis of its respective waveguide. The assembly may further comprise a substrate comprising a plurality of electromagnetic feed structures, wherein each of the plurality of electromagnetic feed structures is operably coupled to a corresponding waveguide of the plurality of waveguides to deliver electromagnetic waves through the plurality of waveguides.

Some embodiments may further comprise a plurality of periodic structures, which may be formed in the substrate or another layer/element of the assembly. The plurality of periodic structures may comprise, for example, an array of electromagnetic band-gap structures or a zipper-structure configured to confine electromagnetic waves and/or signals within the waveguide(s). In some embodiments, each of the plurality of periodic structures lacks vias.

In a more particular example of a periodic, signal confinement structure, each such structure may comprise a first elongated opening. In some such embodiments, each of the plurality of periodic structures may further comprise a first series of repeated slots extending at least substantially transverse to the first elongated opening, wherein each of the first series of repeated slots is spaced apart from an adjacent slot in the first series of repeated slot along the first elongated opening.

Each of the plurality of periodic structures may, in some embodiments, comprise a first periodic structure positioned on a first side of at least a first waveguide of the plurality of waveguides and a second periodic structure positioned on a second side of the first waveguide opposite the second side. Each of the first periodic structure and the second periodic structure may comprise a first elongated opening and a first series of repeated slots extending at least substantially transverse to the first elongated opening, wherein each of the first series of repeated slots is spaced apart from an adjacent slot in the first series of repeated slot along the first elongated opening.

Some embodiments may further comprise a channel intersecting the first elongated opening of the first periodic structure and the first elongated opening of the second periodic structure.

Some embodiments may further comprise a dielectric chamber extending adjacent to each of the plurality of periodic structures. The dielectric chamber(s) may be defined by opposing rows of conductive vias extending along opposing sides of each of the plurality of periodic structures or, alternatively, by a continuous border between a conductive region and a dielectric region defining the chamber.

One or more of the plurality of waveguide grooves may extend back and forth in a periodic manner, a quasi-periodic manner, or may otherwise meander back and forth along the axis of its respective waveguide.

One or more of the plurality of waveguides may comprise a single slot, which in some such embodiments may extend at least substantially straight along an axis of its respective waveguide groove. Alternatively, a series of spaced slots, which may be aligned or staggered relative to one another, may be used, from which electromagnetic waves may be delivered and/or received.

Some embodiments may further comprise a hub region. One or more (in some cases, each) of the plurality of waveguides may terminate at the hub region. The hub region may comprise radiofrequency generation elements for launching electromagnetic radiation into each of the plurality of waveguides.

Some embodiments may further comprise a conductive tape coupled with the substrate or another conductive coupling structure coupled with the substrate, such as a conductive epoxy or solder.

In another example of a vehicle sensor antenna assembly according to other embodiments, the assembly may comprise a plurality of waveguides, wherein each waveguide of the plurality of waveguides is defined by a waveguide groove. A slot may be positioned to extend along an axis of each of the plurality of waveguide grooves. Each of the waveguides may further be defined, at least in part, by a periodic feature that extends back and forth in a periodic manner along at least a portion of its respective waveguide. A plurality of periodic signal confinement structures may also be provided. A first periodic signal confinement structure of the plurality of periodic signal confinement structures may extend adjacent to a first side of each of the plurality of waveguides, and a second periodic signal confinement structure of the plurality of periodic signal confinement structures may extend along a second side of each of the plurality of waveguides opposite the first side.

Some embodiments may further comprise a dielectric substrate. In some embodiments, each of the plurality of periodic signal confinement structures may be positioned within the dielectric substrate. In some such embodiments, each of the plurality of periodic signal confinement structures may comprise a zipper-like structure comprising an elongated slot and a plurality of spaced slots extending transverse to the elongated slot, such as perpendicular to the elongated slot, for example.

In some embodiments, each of the plurality of periodic signal confinement structures may further comprise a dielectric chamber. Preferably, the elongated slot forms an opening into the dielectric chamber of each of the plurality of periodic signal confinement structures.

In some embodiments, the dielectric chamber of each of the plurality of periodic signal confinement structures may be defined by a first row of conductive vias extending along a first side of the dielectric chamber and a second row of conductive vias extending along a second side of the dielectric chamber opposite the first side of the dielectric chamber.

The dielectric chamber of each of the plurality of periodic signal confinement structures may be defined in part (such as on opposing top and bottom portions/layers) by a first conductive layer and a second conductive layer spaced apart from the first conductive layer.

Some embodiments may comprise a hub region. In some such embodiments, one or more of the waveguide grooves may comprise a straight portion extending along an at least substantially straight elongated axis and a curved portion. In some embodiments, the curved portion may lead into the hub region. The straight portion may, in some embodiments, extend back and forth in a periodic manner along at least a portion of the elongated axis such that the axis of the straight portion is straight but the waveguide groove itself extends back and forth from one side of the axis to the other.

In some embodiments, each of the at least a subset of the plurality of waveguide grooves comprises a single, straight slot. In some such embodiments, this slot may extend within each waveguide groove along the straight portion.

Some embodiments may further comprise one or more plates or similar structures that may be coupled to the waveguide block, which may be used to redirect EM waves/energy from two slots at a first distance apart in such a way that the energy/waves exits from two opposing slots that are closer together or at a second distance apart less than the first distance. In other words, the plate structure, which may comprise one or more slots, may be used to obtain a lateral shift of an adjacent pair of slots.

The plate(s) may extend over two or more plates and may comprise an elongated slot, which slot may extend in between (and in some cases parallel to) two adjacent slots of the antenna structure. A ridge extending between the two adjacent slots, combined with the slot of the plate, may be used to create two opposing adjacent slots that may be closer together than the opposing slots not created by the slot of the plate. In some embodiments, the spacing of the closer slots created by the slot of the plate may be about half wavelength in order to generate the desired antenna pattern.

In some embodiments, the slot of the plate may be centered, or at least substantially centered, in between the two adjacent antenna slots (which may be in a separate plane and/or layer). In some embodiments, the slot of the plate may be misaligned and/or not overlap with any of the adjacent antenna slots. In other embodiments, the slot of the plate may overlap, at least in part, with one or both of the adjacent antenna slots.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 1A is a perspective view of a first side of a RADAR sensor assembly according to some embodiments;

FIG. 1B is a perspective view of a second side of the RADAR sensor assembly of FIG. 1A from a second side opposite the first side;

FIG. 3A is a plan view of the RADAR sensor assembly;

FIG. 3B is a cross-sectional view taken along line 3B-3B in FIG. 3A;

FIG. 4A is a perspective view of a first side of a RADAR sensor assembly according to other embodiments;

FIG. 4B is a perspective view of a second side of the RADAR sensor assembly of FIG. 4A from a second side opposite the first side;

DETAILED DESCRIPTION

Figure 1C:
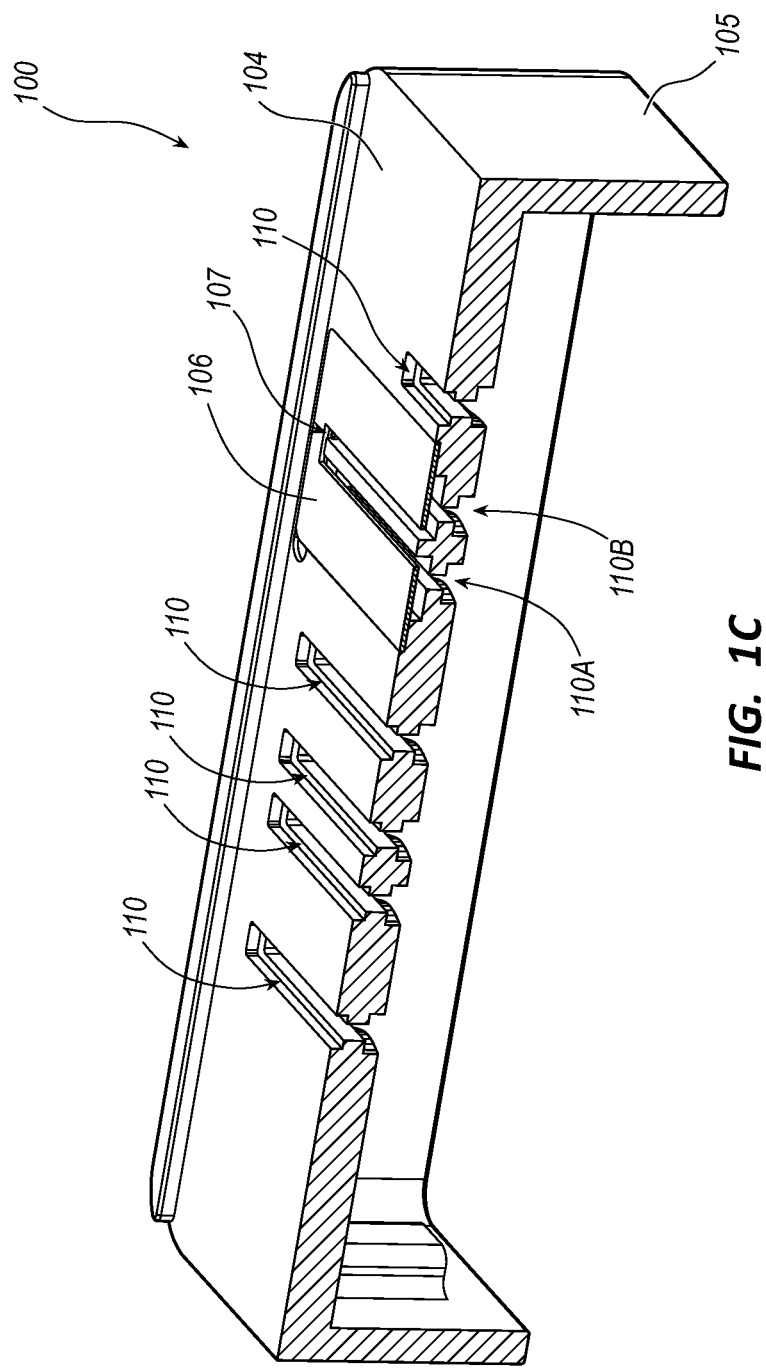
FIG. 1C is a cross-sectional view of the RADAR sensor assembly of FIGS. 1A and 1B.
Figure 2:
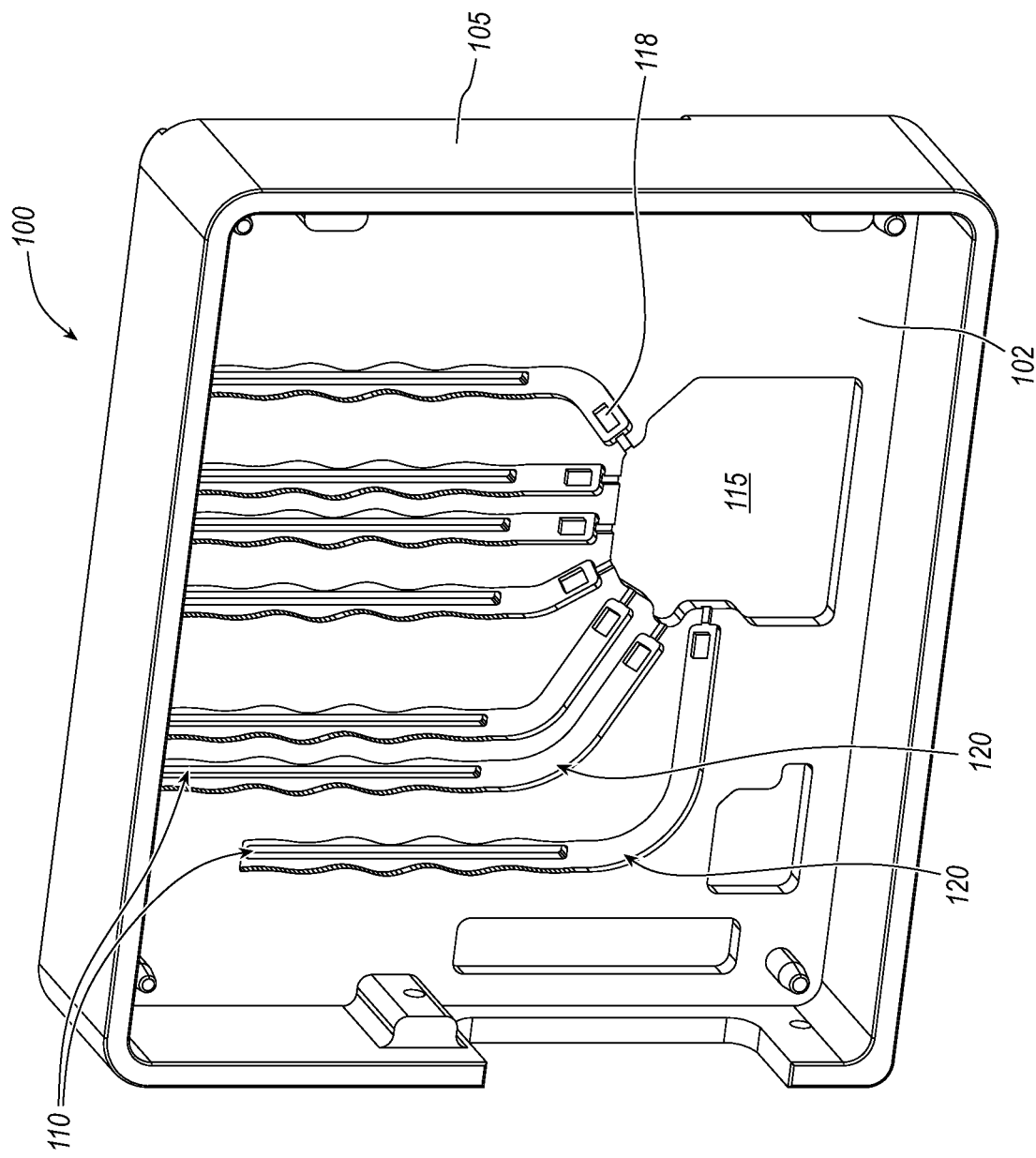
FIG. 2 depicts the RADAR sensor assembly from a different perspective.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIGS. 1-3B depict a waveguide/sensor assembly 100, such as a RADAR sensor assembly for a vehicle, that defines, either in whole or in part, one or more waveguides therein and may comprise a portion of, for example, an antenna assembly, which antenna assembly may comprise one or more antennae.

Thus, as depicted in FIG. 1A, waveguide assembly 100 comprises a housing or body 105 comprising a plurality of waveguide grooves 120 extending from a hub region 115. It should be understood that hub region 115 would typically include various electrical components, such as electromagnetic generation chips or other elements, that are not shown in the figures to avoid obscuring the disclosure. A suitable electromagnetic feed or transition structure 118 to facilitate transitioning electromagnetic waves/signals to waveguide grooves 120 is shown positioned at a terminal end of each of the waveguide grooves 120.

Each of the various waveguide grooves 120 oscillates, at least in part, back and forth along an elongated axis. In the depicted embodiment, this oscillation is provided by oscillating both opposing sidewalls that define waveguide grooves 120 along at least a portion thereof. However, it is contemplated that, in alternative embodiments, only one of the two opposing sidewalls may oscillate in this manner. It is also contemplated that, in still other embodiments, the sidewalls may meander/oscillate back and forth in a non-smooth manner, such as a stepwise manner and/or to define a square-wave pattern, if desired. In addition, although it may be preferred to provide an oscillation pattern in which both opposing sidewalls defining the waveguide groove oscillate together, or at least substantially together, as is the case with waveguide grooves 120, it is also contemplated that, in other embodiments, the sidewalls may oscillate separately and/or in a non-synchronized manner in other embodiments.

Within each of the various waveguide grooves 120, an elongated slot 110 is formed, which slot 110 may extend along the oscillating portion of each waveguide groove 120. In the depicted embodiment, each slot 110 is centered within its respective groove. It should be understood that, in alternative embodiments, a plurality of posts may be arranged in opposing rows to define a waveguide groove therebetween, as discussed in connection with later figures.

It should also be understood that any number of antennae may be provided and therefore any desired number of corresponding antennae structures—such as a plurality of waveguides, grooves, etc.—may be provided. However, some embodiments may comprise an array having a single antenna and therefore only a single waveguide. As described in greater detail elsewhere in this disclosure, the waveguides described herein may be defined in a variety of ways and may curve about the block/assembly as desired according to the space available. In addition, it should also be understood that the accompanying figures depict only certain elements and/or aspects of antenna assemblies and/or waveguides and that, in order to properly function, other elements would typically need to be provided in a complete assembly/module having other functional elements that are not shown or described herein to avoid obscuring the disclosure.

In preferred embodiments, waveguide assembly 100 may comprise, at least in part, a casting, such as a casting comprising a Zinc or other suitable preferably metal material. However, in other contemplated embodiments, such block may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with the block/casting. For example, although the preferred embodiments disclosed herein comprise slots that are formed directly within the block, alternative embodiments are contemplated in which such slots may be formed in a separate layer, in some cases along with other layers and/or elements that are not depicted herein to avoid obscuring the disclosure, to form an antenna and/or sensor assembly/module.

In addition, although the amplitude of the oscillation of the waveguide grooves 120 shown in FIGS. 1A and 1B is relatively constant, in other embodiments this need not be the case. More particularly, in some embodiments, the amplitude of the oscillation in the pattern of one or more of grooves 120 may increase towards a center of the pattern and then taper in the opposite, decreasing direction towards the opposite end. However, again, this may vary as needed according to the specifications and prescribed uses for the waveguide and/or antenna structures described herein. Moreover, various other alternatives are contemplated, such as providing a series of spaced slots for the antenna of each waveguide rather than a single slot 110 as shown in FIGS. 1A and 1B. Similarly, such spaced slots may, but need not, oscillate.

As shown in FIG. 1B, each of the various slots 110 may open along side 104 of assembly 100. As also shown in FIG. 1B, in some embodiments, one or more of slots 110 may be positioned within a widened portion or groove on the opposite side of waveguide grooves 120.

As also shown in FIG. 1B, and in the cross-sectional view of FIG. 1C, in some embodiments, a slotted plate 106 may be provided in connection with some of the antenna slots. More particularly, such slotted plates 106 (although only one is shown in the depicted embodiment, it should be understood that multiple such plates may be used in other embodiments as needed) may be particularly useful in connection with waveguide grooves and/or antenna slots that are relatively close to one another, as is the case with the adjacent antenna slots 110A and 110B operably coupled with plate 106. These two slots 110A/110B are positioned in the same cavity and have a relatively thin wall separating them.

Slot 107 of plate 106 may be positioned at a central, or in a substantially central in other contemplated embodiments, location in between slots 110A and 110B, as best seen in FIG. 1C. In the depicted embodiment, slot 107 is also misaligned with both slots and creates two new slots on the opposite end (on opposite sides of the ridge along the center of slot 107, as shown in this same figure. Use of plate 106 may allow for maximizing space on a board/assembly by bringing the effective antennas created by plate 106 and antenna slots 110A/110B closer together while allowing their associated waveguides to be positioned further apart. This may also be useful to improve performance of the RADAR sensors of assembly 100. For example, by keeping the waveguides further apart, more posts may be used on either side of the associated waveguides, which may provide for better field confinement.

To describe the purpose of slot 107 with more particularity, by placing slot 107 such that a ridge is positioned along the center, or at least a central region, of the slot 107, two new, adjacent slots are created (one on each side of the ridge). These new slots created by slot 107 are closer together than the slots 110A/110B on the opposite side of the structure within respective waveguide grooves, as shown in FIG. 1C. Thus, slot 107 along with the adjacent thin wall/ridge creates two new slots.

Energy/EM waves from slot 110B may therefore make a leftward movement and exit from the new right slot created by slot 107 and the adjacent ridge/wall (from the perspective of FIG. 1C) and, similarly, energy/EM waves from slot 110A may make a rightward movement and exit from the new left slot created by slot 107 and the adjacent ridge/wall. Effectively, slots 110A and 110B may thereby be brought closer to one another. This may allow the radiating slots, which are the slots formed by the housing 105 and the plate 106, to be close to each other, while allowing the feeding grooves/slots on the opposite side to be further apart.

Plate 106 may comprise, for example, a metal or other conductive material. However, it is thought that a non-conductive attachment may be used if designed appropriately. In some embodiments, plate 106 may comprise a conductive tape or a non-conductive adhesion. Plate 106 may be coupled to body 105 by, for example, use of conductive tape, conductive epoxy, soldering, welding, or the like.

As best seen in the cross-sectional view of FIG. 3B, which is taken through one of the slots 110, each of the slots extends through the block/casting of assembly 100 from side 102 to side 104 to allow for transmission and/or receipt of electromagnetic waves therethrough. In some embodiments, the assembly may further comprise a conductive layer that may be used to form a "cap" of sorts on the plurality of waveguides 120. In some such embodiments, a layer of conductive tape may be used to couple a conductive layer, which may be part of a PCB layer, to the block/waveguide layer of the assembly. This layer is shown in FIGS. 3A and 3B on top of the upper surface of side 102.

FIGS. 4A-6B illustrate an alternative embodiment of a RADAR sensor assembly 400. Like assembly 100, assembly 400 comprises an antenna and/or waveguide block that defines, either in whole or in part, one or more waveguides therein and a plurality of antennae. However, unlike waveguide assembly 100, waveguide assembly 400 comprises a plurality of waveguide grooves 420 that are defined by opposing rows of posts rather than a trench-style waveguide. Although two spaced rows of posts are positioned on each side of each waveguide 420 defined therebetween, other embodiments are contemplated in which a single row, or more than two rows, of such posts may be positioned on either side of one or more of the waveguides 420.

In addition, each of the waveguide grooves 420 oscillates, at least in part, back and forth along an elongated axis. In the depicted embodiment, this oscillation is provided by oscillating both opposing sets of posts that define waveguide grooves 420 along at least a portion thereof. However, it is contemplated that, in alternative embodiments, only one of the two opposing sets of posts may oscillate in this manner. It is also contemplated that, in still other embodiments, the posts may be positioned to meander/oscillate back and forth in a non-smooth manner, such as a stepwise manner and/or to define a square-wave pattern, if desired. In addition, although it may be preferred to provide an oscillation pattern in which both opposing sets of posts defining the waveguide groove oscillate together, or at least substantially together, as is the case with waveguide grooves 420, it is also contemplated that, in other embodiments, the posts on one side of one or more of the waveguide grooves 420 may oscillate separately and/or in a non-synchronized manner in other embodiments. It is also contemplated that, whereas in the depicted embodiment the rows of posts on either side of each waveguide groove 420 are aligned, in other embodiments, these posts may be staggered relative to one another such that each post in one row is positioned adjacent to a space between adjacent posts in an adjacent row of posts.

As with assembly 100, an elongated slot 410 may be positioned within each waveguide groove 420, each of which slots 410 may extend along the oscillating portion of each waveguide groove 420. In the depicted embodiment, each slot 410 is centered within its respective groove. However, as mentioned above, this need not be the case in all contemplated embodiments.

Similarly, as with waveguide assembly 100, waveguide assembly 400 comprises a housing or body 405 defining a hub region 415 from which each of the various waveguides may be extend and be coupled. As previously mentioned, this hub region 415 would typically include various electrical components, such as electromagnetic generation chips or other elements, that are not shown in the figures but, as those of ordinary skill in the art will appreciate, would typically be present to generate, receive, and/or process electromagnetic waves/signals. A suitable electromagnetic feed structure 418 to facilitate transitioning electromagnetic waves/signals to waveguide grooves 420 or another similar EM-generating element may again be positioned at a terminal end of each of the waveguide grooves 420.

Each of the slots 410 again extends through the block/casting of assembly 400 from side 402 to side 404 to allow for transmission and/or receipt of electromagnetic waves therethrough. In addition, each of the various slots 410 may open along side 404 within a widened portion or groove on the opposite side of the assembly with respect to waveguide grooves 420.

Figure 4C:
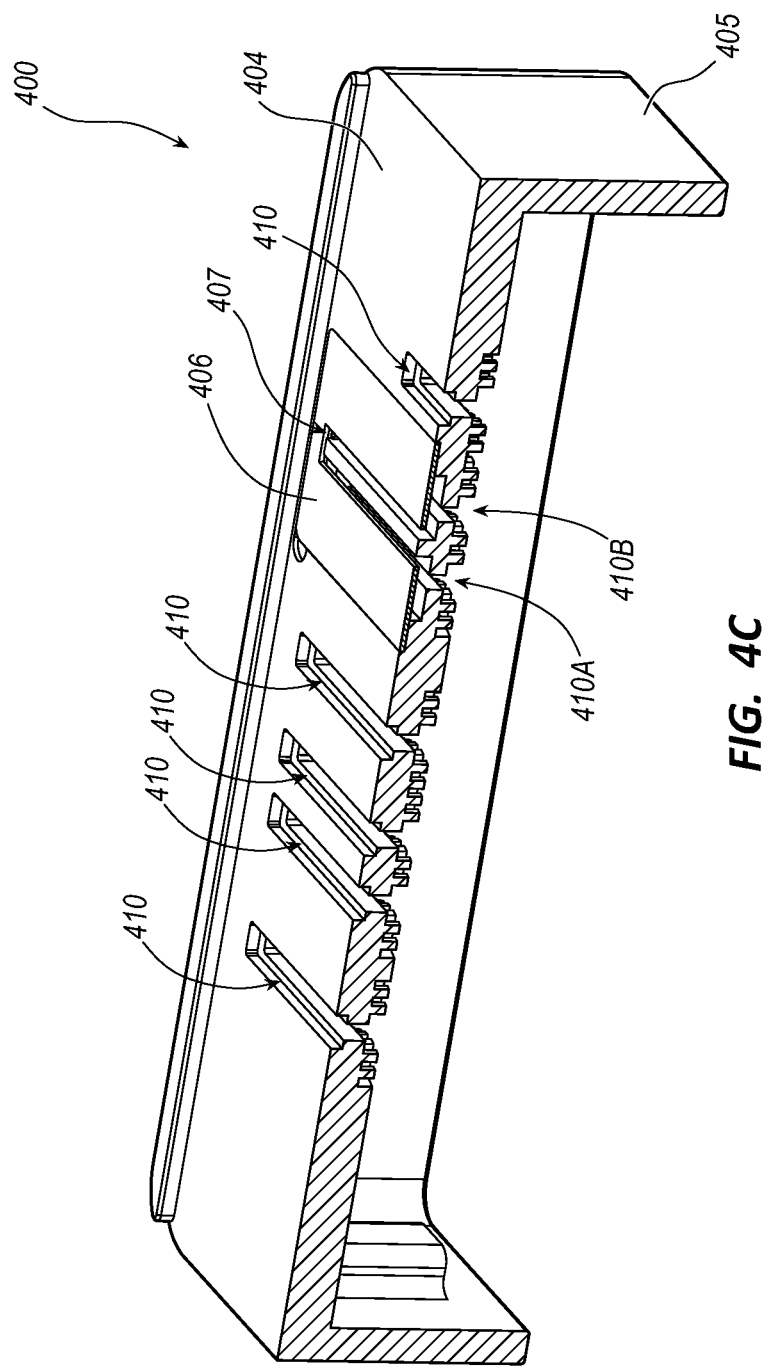
FIG. 4C is a cross-sectional view of the RADAR sensor assembly of FIGS. 4A and 4B.
Figure 5:
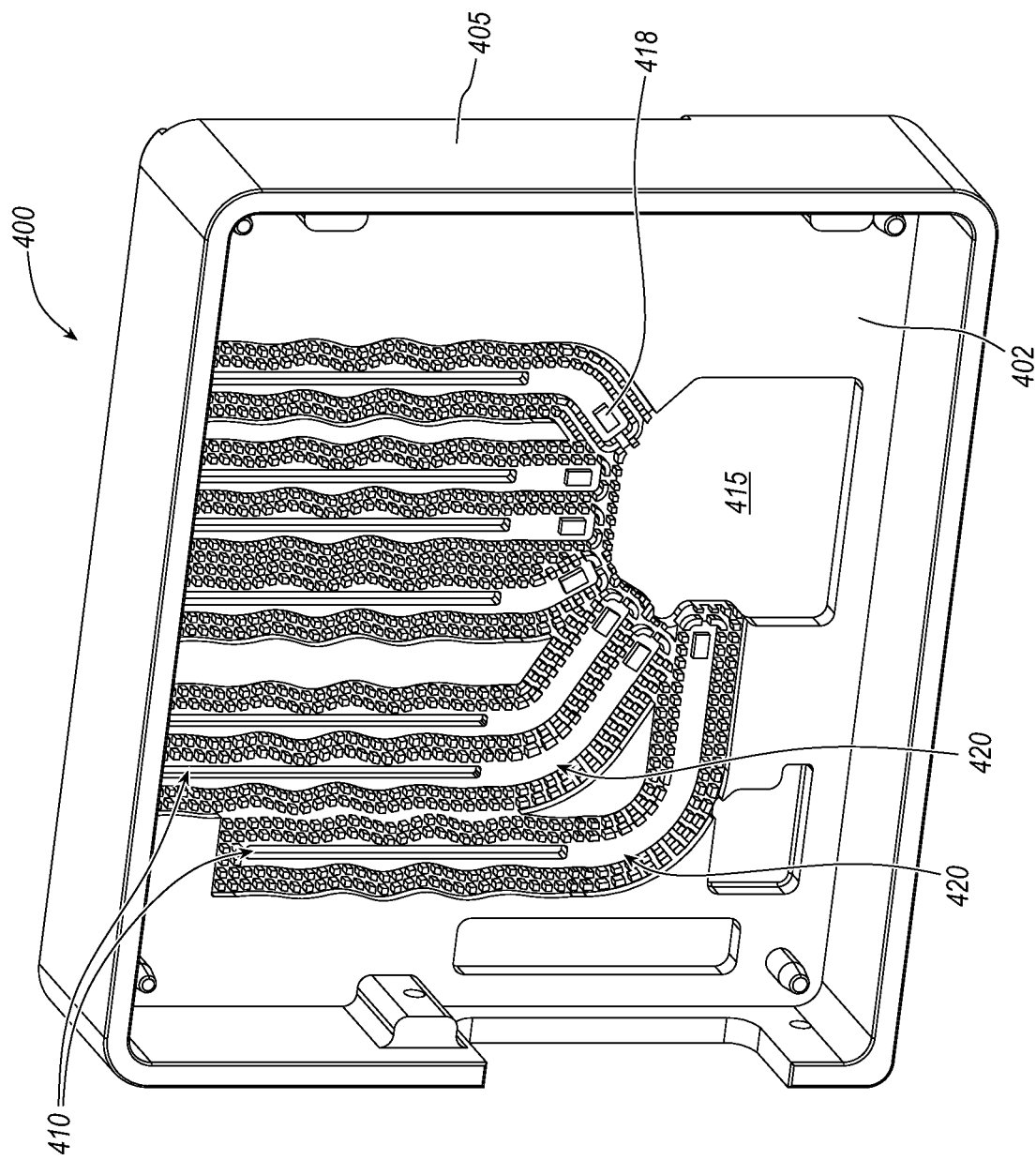
FIG. 5 depicts the RADAR sensor assembly of FIGS. 4A and 4B from a different perspective.
Figure 6B:
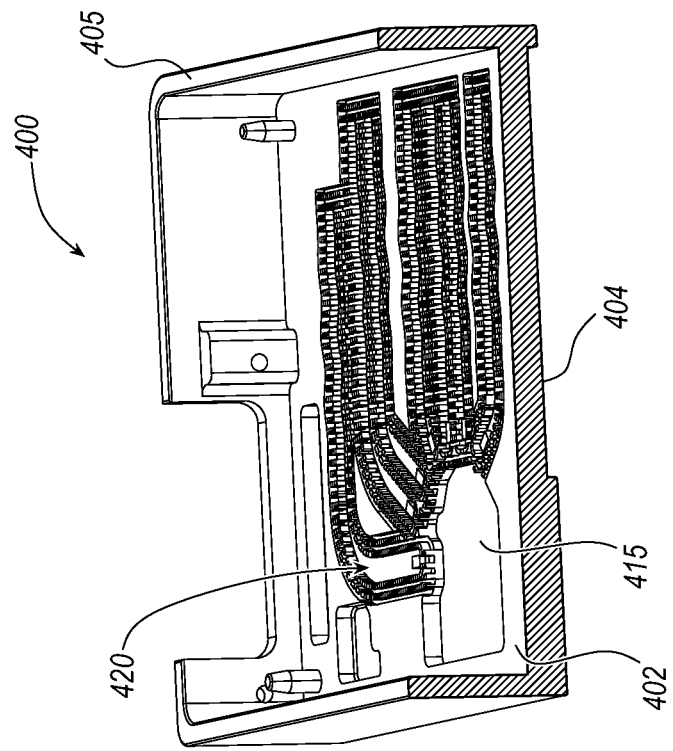
FIG. 6B is a cross-sectional view taken along line 6B-6B in FIG. 6A.
Figure 6A:
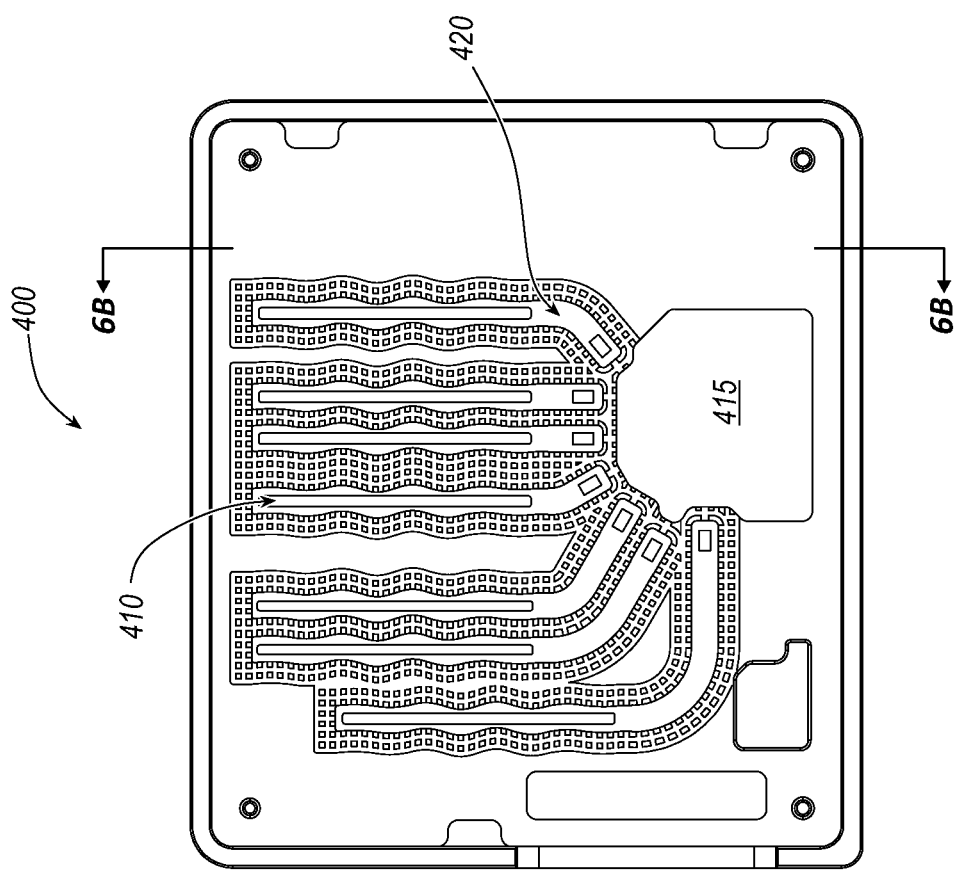
FIG. 6A is a plan view of the RADAR sensor assembly of FIGS. 4A-5.

As also shown in FIG. 4B, and as better shown in the cross-sectional view of FIG. 4C, in some embodiments, a slotted plate 406 may be provided in connection with some of the antenna slots. More particularly, such slotted plates 406 may be particularly useful in connection with waveguide grooves and/or antenna slots that are relatively close to one another, as is the case with the adjacent antenna slots 410A and 410B operably coupled with plate 406. These two slots 410A/410B are positioned in the same cavity and have a relatively thin wall separating them.

Slot 407 of plate 406 is positioned at an at least substantially central position in between slots 410A and 410B, as best seen in FIG. 4C and the ridge along plate 406, which, as described above, may be configured to create two slots on either side of the ridge, may also be positioned centrally, or at least substantially centrally along slot 407, as described above. In the depicted embodiment, slot 407 is also misaligned with both antenna slots 410A/410B but extends parallel to both antenna slots 410A/410B in between them. As previously mentioned, plate 406 may allow for maximizing space on a board/assembly by bringing the effective antennas created by plate 406 and antenna slots 410A/410B closer together while allowing their associated waveguides to be positioned further apart. This may also be useful to improve performance of the RADAR sensors of assembly 400. For example, by keeping the waveguides further apart, more posts may be used on either side of the associated waveguides, which may provide for better field confinement. Again, plate 406 may be coupled to body 405 by, for example, use of conductive tape, conductive epoxy, soldering, welding, or the like.

Figure 7B:
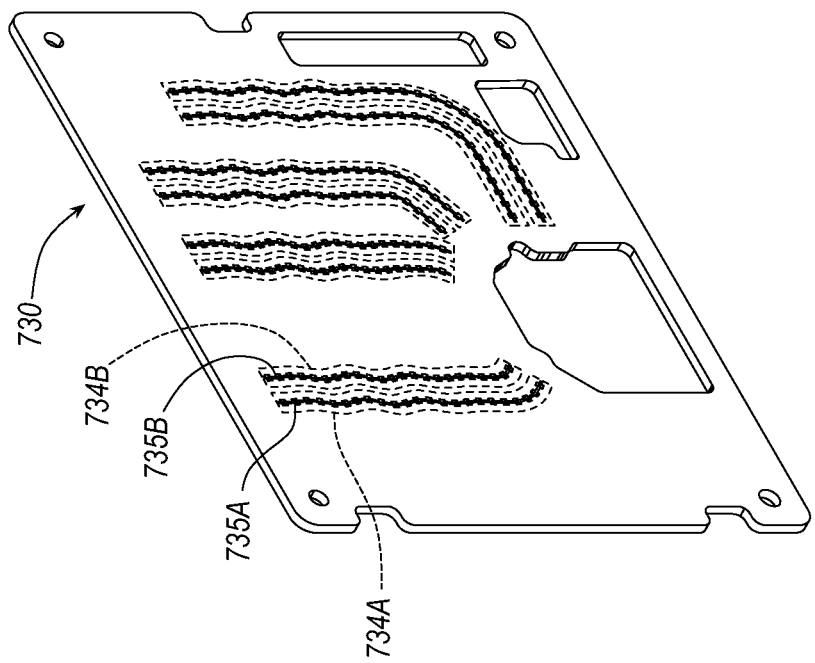
FIG. 7B depicts the RADAR sensor assembly portion of FIG. 7A from an opposite side.
Figure 7A:
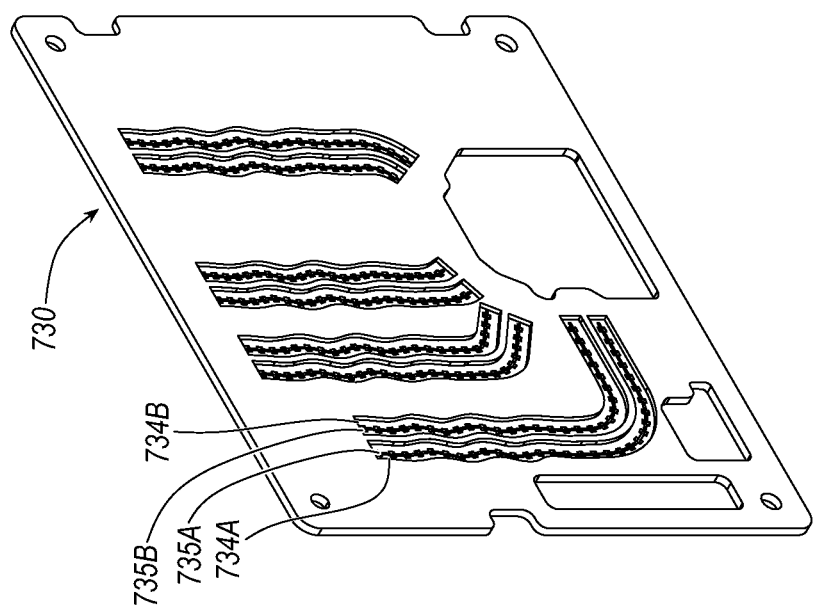
FIG. 7A depicts a portion of a RADAR sensor assembly comprising a zipper-like signal confinement structure.
Figure 8:
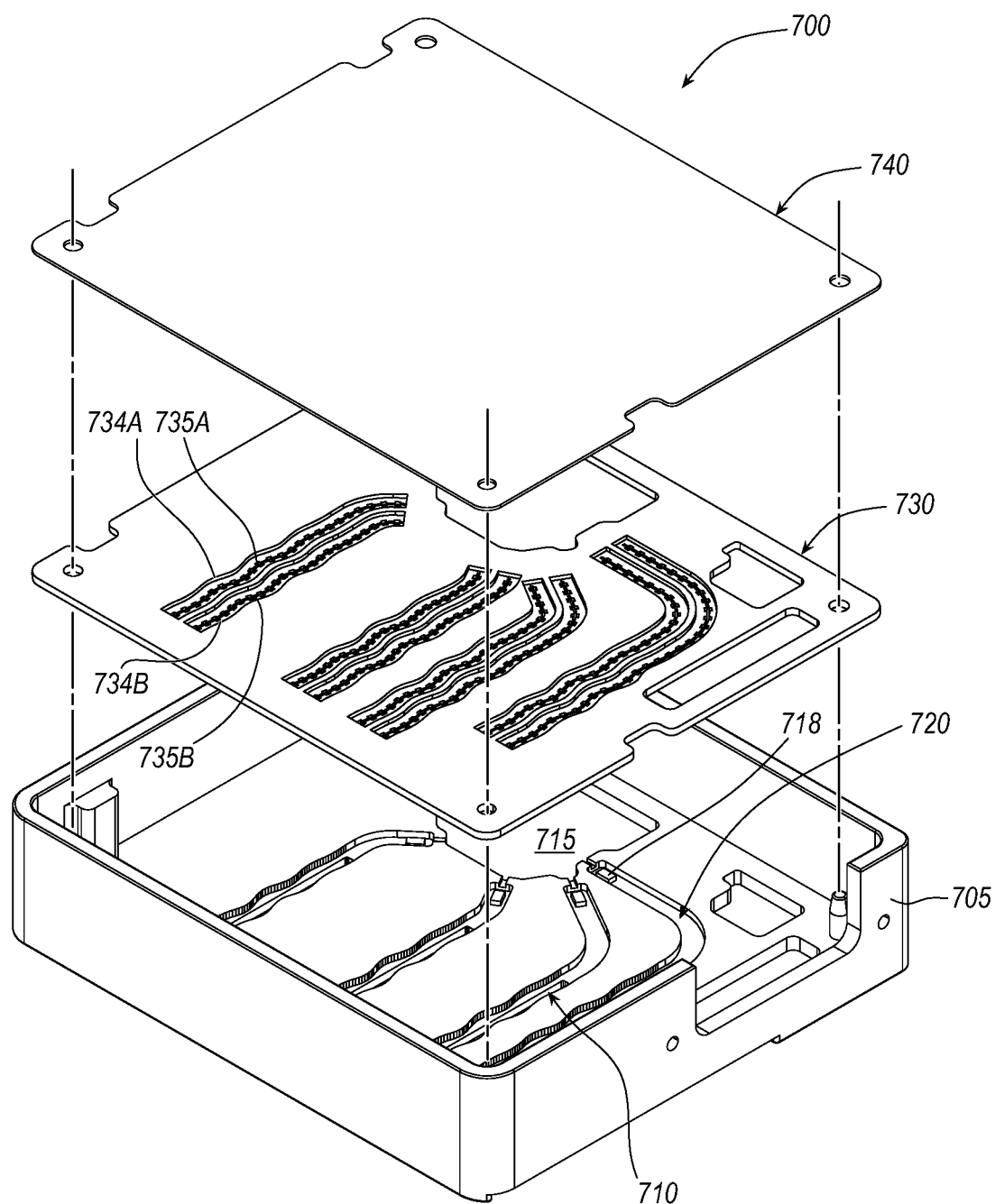
FIG. 8 is an exploded, perspective view of a RADAR sensor assembly according to still other embodiments.
Figure 9:
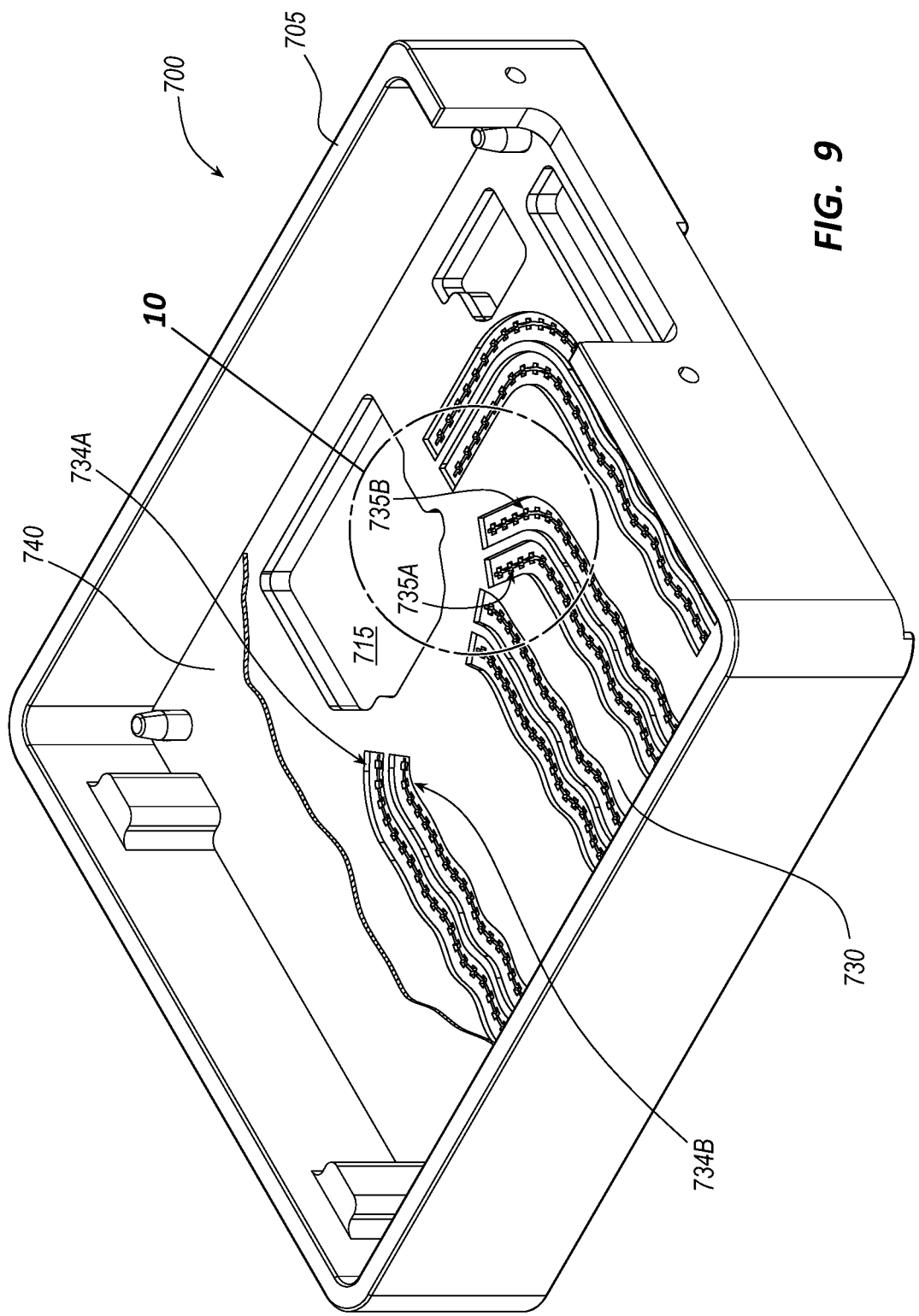
FIG. 9 is a cutaway, perspective view of the RADAR sensor assembly of FIG. 8.

Still another example of an alternative embodiment of a RADAR sensor assembly 700 is depicted in FIGS. 7A-11. FIGS. 7A and 7B depict opposing sides of a substrate layer 730 of assembly 700. Substrate 730 may comprise one or more layers and/or functional elements that may be used to confine and/or prevent or at least reduce unwanted leakage of electromagnetic energy and/or signals within the various waveguides of the assembly. In some embodiments, substrate 730 may comprise a printed circuit board that may comprise one or more metallic/conductive layers coupled thereto. EM/signal confinement structures may be incorporated into substrate 730, preferably along both opposing sides of each of the waveguide grooves 720, as best shown in FIG. 8.

A first layer and/or surface of substrate/PCB 730 is shown in FIG. 7A, which depicts a pair of parallel resonant cavities or chambers 734, namely a first chamber 734A and a second chamber 734B, together which extend along opposing sides of an adjacent waveguide groove 720, which is formed in an adjacent layer of the assembly 700. Thus, chamber 734A is configured to extend along and adjacent to a first side of an adjacent waveguide groove 720 and a second chamber 734B is configured to extend along and adjacent to a second side of the same waveguide groove 720. Preferably, each of the waveguide grooves 720 in the assembly therefore comprises chambers formed along each opposing side thereof to confine signals within each of the waveguide grooves 720.

In the depicted embodiment, these chambers 734 extend parallel, or at least substantially parallel, to each associated waveguide groove 720. However, this need not be the case for all contemplated embodiments. Although not shown in the figures, interconnecting chambers may be formed on the opposite ends of one or more of chambers 734 if needed/desired.

Chambers 734 may, in some preferred embodiments, comprise dielectric chambers. In other words, these chambers may be made up of a dielectric material, such as, for example, a glass fiber reinforced (fiberglass) epoxy resin material or the like, a thermoplastic material, or a ceramic material. In some contemplated embodiments, the dielectric chambers may be empty and therefore may be occupied only by air.

FIG. 7B depicts the opposite side of substrate 730, the surface of which may comprise a metallic/conductive material and/or layer. It may be important for electrical contact to be provided for in this region of assembly 700. However, in some embodiments described herein, a gap may be maintained between the adjacent surface defining the waveguides 720 and the PCB/substrate 730. To avoid or at least reduce signal leakage in this region, one or more preferably metallic and/or electrically conductive structures may be formed within the PCB/substrate layer 730. In the depicted embodiment, these confinement structures comprise periodic structures operably coupled to the waveguide formed within the adjacent waveguide block that define a zipper-like shape within the metallic portion of the layer/region adjacent to the waveguides 720.

These zipper-like structures 735 are shown in FIG. 7B. More particularly, a first zipper structure 735A is formed in a metallic portion and/or layer of substrate 730 and configured to be positioned adjacent to and extend along a first side of each of the waveguide grooves 720 and a second zipper structure 735B is formed in the same metallic portion and/or layer of substrate 730 and configured to be positioned adjacent to and extend along a second side of each of the waveguide grooves 720 opposite the first side.

Figure 10:
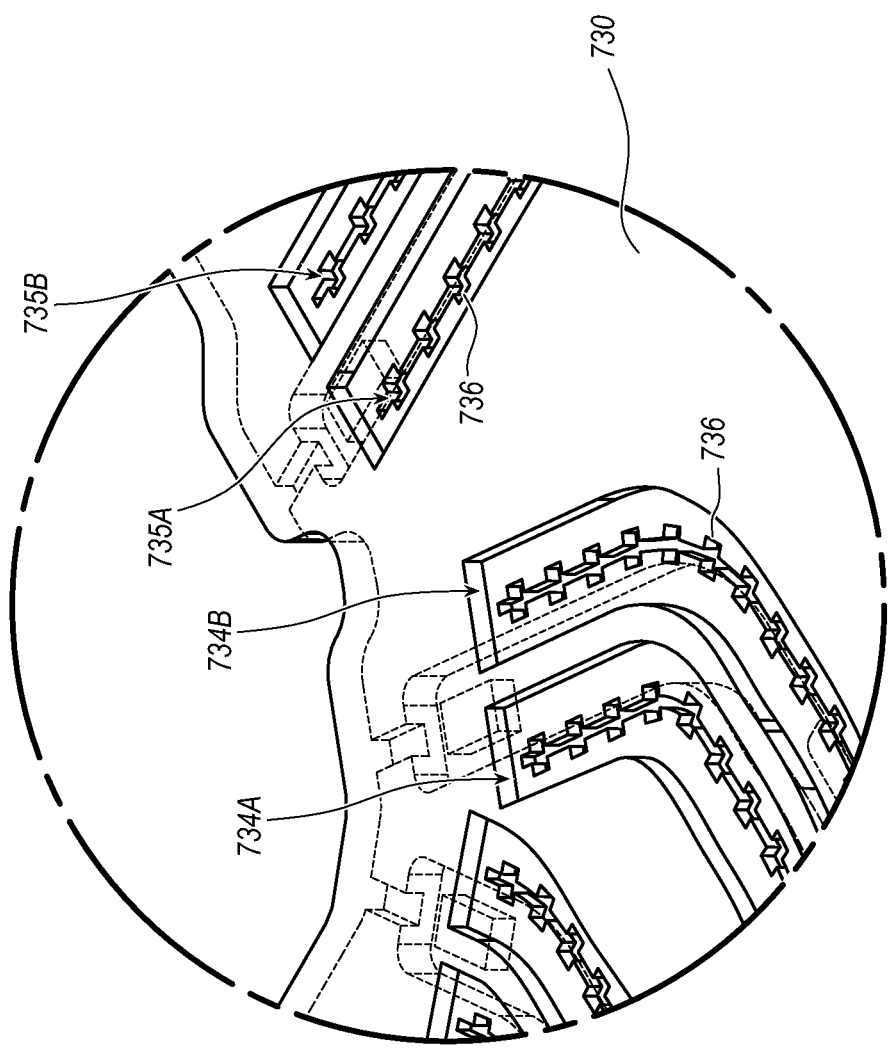
FIG. 10 is an enlarged view of a portion of the zipper-like confinement structure of the RADAR sensor assembly of FIG. 9.
Figure 11:
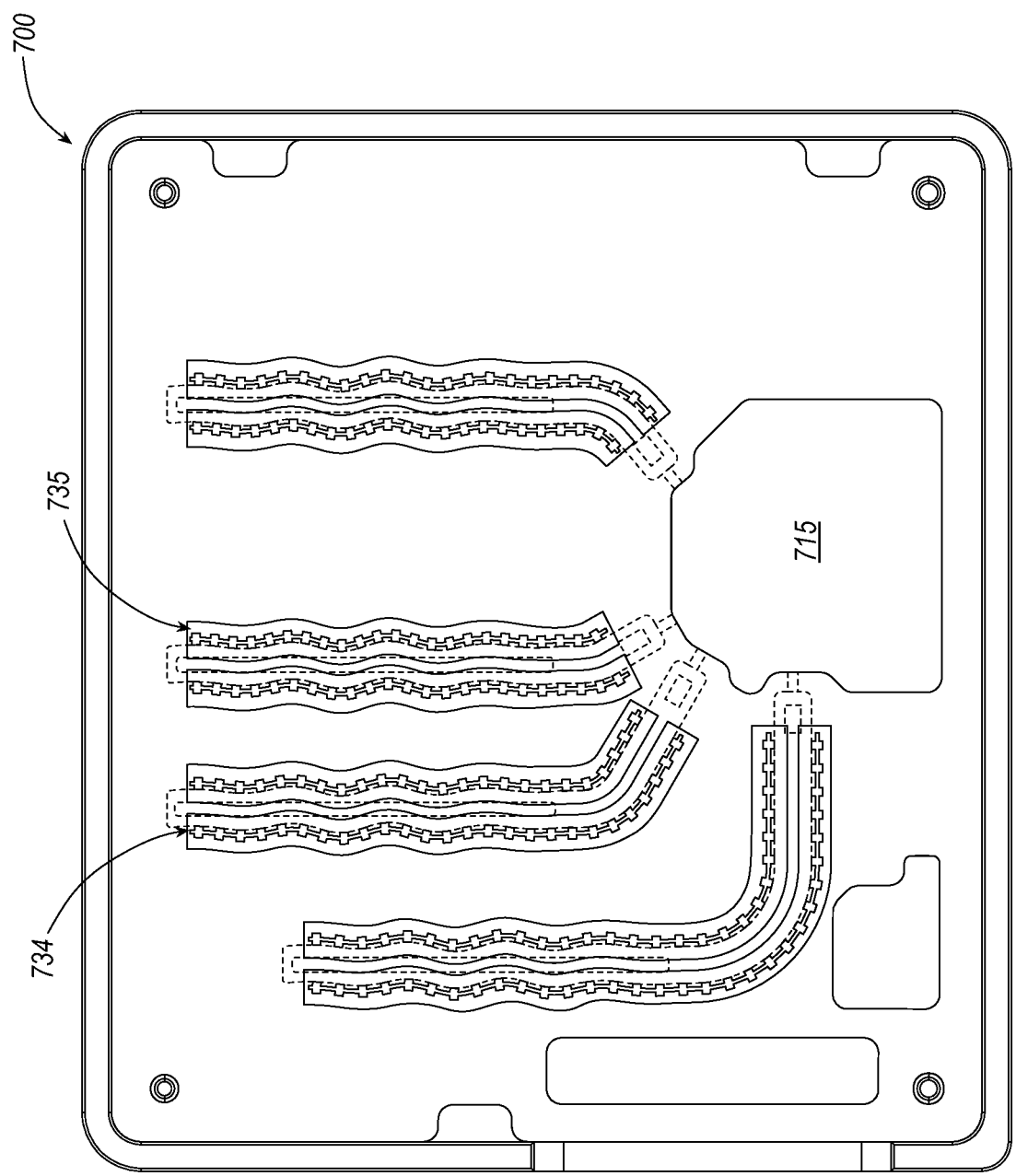
FIG. 11 is a plan view of the RADAR sensor assembly of FIGS. 8-10 illustrating the dielectric chambers associated with the zipper-like signal confinement structures of the assembly.

As best seen in the enlarged view of FIG. 10, these periodic structures comprise an elongated opening or slot that preferably extends along a line that may run parallel, or at least substantially parallel, to the adjacent waveguide along one or more sides thereof. This structure may be formed in a metallic/conductive layer or portion of the assembly that is positioned immediately adjacent to the waveguide block within which the waveguide grooves 720 are formed. The zipper-like confinement structures further comprise a first series of repeated slots 736 formed along one side of each elongated opening of each zipper structure 735 extending along the axis of each such zipper structure 735 and a second series of repeated slots 736 formed along the opposite side of each such elongated, axial opening, both of which extend into and connect with the elongated opening that leads into the dielectric chamber. In the depicted embodiment, these opposing slots 736 are aligned with one another.

Each of the aforementioned openings/slots of zipper structures 735A/735B extends into a respective widened dielectric chamber 734A/734B, which may be formed at the side of substrate 730 opposite the metallic portion and/or layer of the assembly. In other words, the zipper structures may be formed in a metallic coating of substrate/PCB 730 or, in other contemplated embodiments, in a separate, metallic layer of the assembly with respect to the dielectric chambers of the assembly or a single layer may be used and dielectric chambers may be formed within this layer, if desired.

In preferred embodiments, the elongated slot or opening of each zipper structure 735 may be centered, or at least substantially centered, with respect to each respective chamber 734 and slots 736 may extend perpendicular, or at least substantially perpendicular, with respect to the elongated slot/opening. These slots 736 may also extend only partially from each elongated slot/opening to the outer edges of the associated chamber 734, as shown in the figures. As previously mentioned, chamber 734 preferably comprises a dielectric material, such as a typical material used to manufacture a PCB, such as FR4 material, for example. The outer edges of each chamber 734 may be defined by metallic and/or conductive borders, which may either be continuous or may be defined by a plurality of spaced conductors, such as vias, which may extend through opposing metallic/conductive layers/portions of the assembly.

Thus, in some embodiments, the opposing borders of one or more (in some embodiments, each) of the dielectric chambers 734 may extend the entire length of chamber 734. In other words, the material on either side of each chamber 734 may be continuously metallic/conductive. However, again, other embodiments are contemplated in which these borders may be defined by a series of vias or other spaced conductors, which may extend between opposing metallic/conductive layers of the assembly. It should be understood that this ground/opposing conductive layer would typically form a lid or other boundary for chamber 734, such as layer 740 depicted in FIG. 8. It should be understood that layer 740 may be a separate layer of the assembly or may be a metallic coating or the like.

Waveguide/sensor assembly 700 may otherwise be similar to those in the previous figures. Thus, waveguide assembly 700 comprises a housing or body 705 defining a hub region 715 from which each of the various waveguides may be extend and be coupled. Similarly, a suitable electromagnetic feed structure 718 to facilitate transitioning electromagnetic waves/signals to waveguide grooves 720 may again be positioned at a terminal end of each of the waveguide grooves 720 or otherwise configured to deliver and/or receive electromagnetic waves/signals, as those of ordinary skill in the art will appreciate. As also previously described in greater detail, each of the waveguide grooves comprises a portion that oscillates back and forth and further comprises an elongated antenna slot 710 positioned therein. In the depicted embodiment, each of the signal confinement/zipper structures oscillates in a similar manner to its associated waveguide groove 720, although this need not be the case in other contemplated embodiments.

It should be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle sensor assembly, comprising:
 a waveguide block defining a plurality of waveguides, each waveguide defined by a waveguide groove, wherein at least one of the plurality of waveguide grooves oscillates back and forth between opposing sides of a structure defining the respective waveguide groove in a periodic manner along an elongated axis of its respective waveguide;
 an antenna structure operably coupled with plurality of waveguides, wherein the antenna structure comprises an array of one or more slots extending along an elongated axis of each waveguide groove of the plurality of waveguides, wherein each of the one or more slots is configured to deliver electromagnetic radiation from at least one of the plurality of waveguides therethrough, and wherein at least one of: (1) the plurality of waveguide grooves; and (2) the one or more slots extends along the elongated axis of its respective waveguide; and
 a substrate comprising a plurality of electromagnetic feed structures, wherein each of the plurality of electromagnetic feed structures is operably coupled to a corresponding waveguide of the plurality of waveguides to deliver electromagnetic waves through the plurality of waveguides.

2. The vehicle sensor assembly of claim 1, wherein each of the plurality of waveguides comprises a waveguide groove defined by opposing rows of posts.

3. The vehicle sensor assembly of claim 1, further comprising a plurality of periodic structures.

4. The vehicle sensor assembly of claim 3, wherein the plurality of periodic structures is formed in the substrate.

5. The vehicle sensor assembly of claim 3, wherein the plurality of periodic structures comprises an array of electromagnetic band-gap structures.

6. The vehicle sensor assembly of claim 3, wherein each of the plurality of periodic structures comprises:
 a first elongated opening; and
 a first series of repeated slots extending at least substantially transverse to the first elongated opening, wherein each of the first series of repeated slots is spaced apart from an adjacent slot in the first series of repeated slot along the first elongated opening.

7. The vehicle sensor assembly of claim 6, wherein each of the plurality of periodic structures comprises a first periodic structure positioned on a first side of at least a first waveguide of the plurality of waveguides and a second periodic structure positioned on a second side of the first waveguide opposite the second side, and wherein each of the first periodic structure and the second periodic structure comprises:
 a first elongated opening; and
 a first series of repeated slots extending at least substantially transverse to the first elongated opening, wherein each of the first series of repeated slots is spaced apart from an adjacent slot in the first series of repeated slot along the first elongated opening.

8. The vehicle sensor assembly of claim 6, further comprising a dielectric chamber extending adjacent to each of the plurality of periodic structures.

9. The vehicle sensor assembly of claim 8, wherein each of the dielectric chambers is defined by opposing rows of conductive vias extending along opposing sides of each of the plurality of periodic structures.

10. The vehicle sensor assembly of claim 1, wherein the antenna structure of each of the plurality of waveguides comprises a single slot extending at least substantially straight along the elongated axis of its respective waveguide groove.

11. The vehicle sensor assembly of claim 1, further comprising a conductive coupling structure coupled with the substrate, wherein the conductive coupling comprises at least one of a conductive tape and a conductive epoxy.

12. The vehicle sensor assembly of claim 1, further comprising a plate coupled to the waveguide block, wherein the plate comprises an elongated slot, and wherein the elongated slot extends in between two adjacent slots of the antenna structure.

13. A vehicle sensor antenna assembly, comprising:
 a plurality of waveguides, wherein each waveguide of the plurality of waveguides is defined by a waveguide groove;
 a slot extending along an axis of each of the plurality of waveguide grooves, wherein each of the waveguides oscillates, at least in part, in a periodic manner; and
 a plurality of periodic signal confinement structures, wherein a first periodic signal confinement structure of the plurality of periodic signal confinement structures extends adjacent to a first side of each of the plurality of waveguides, and wherein a second periodic signal confinement structure of the plurality of periodic signal confinement structures extends along a second side of each of the plurality of waveguides opposite the first side.

14. The vehicle sensor antenna assembly of claim 13, further comprising a dielectric substrate, wherein the plurality of periodic signal confinement structures is positioned within the dielectric substrate.

15. The vehicle sensor antenna assembly of claim 14, wherein each of the plurality of periodic signal confinement structures comprises:
an elongated slot; and
a plurality of spaced slots extending transverse to the elongated slot.

16. The vehicle sensor antenna assembly of claim 15, wherein each of the plurality of periodic signal confinement structures further comprises a dielectric chamber, wherein the elongated slot forms an opening into the dielectric chamber.

17. The vehicle sensor antenna assembly of claim 16, wherein the dielectric chamber of each of the plurality of periodic signal confinement structures is defined by a first row of conductive vias extending along a first side of the dielectric chamber and a second row of conductive vias extending along a second side of the dielectric chamber opposite the first side of the dielectric chamber.

18. The vehicle sensor antenna assembly of claim 13, further comprising a hub region, wherein at least a subset of the plurality of waveguide grooves comprises a straight portion extending along an at least substantially straight elongated axis and a curved portion, the curved portion leading into the hub region.

19. The vehicle sensor antenna assembly of claim 18, wherein the straight portion oscillates back and forth in a periodic manner along the elongated axis.

20. The vehicle sensor antenna assembly of claim 19, wherein each of the at least a subset of the plurality of waveguide grooves comprises a single slot extending therein along the straight portion.

* * * * *